United States Patent [19]
Blitzke

[11] Patent Number: 5,973,775
[45] Date of Patent: Oct. 26, 1999

[54] DEVICE FOR DETECTING THE WETTING OF A PANE

[75] Inventor: Henry Blitzke, Buehl, Germany

[73] Assignee: Robert Bosch GmbH, Stuttgart, Germany

[21] Appl. No.: 09/000,260
[22] PCT Filed: May 15, 1997
[86] PCT No.: PCT/DE97/00980
§ 371 Date: Jan. 30, 1998
§ 102(e) Date: Jan. 30, 1998
[87] PCT Pub. No.: WO97/46430
PCT Pub. Date: Dec. 11, 1997

[30] Foreign Application Priority Data

May 30, 1996 [DE] Germany ............ 196 21 627

[51] Int. Cl.⁶ ........................................... G01J 1/10
[52] U.S. Cl. ............................................. 356/229
[58] Field of Search ........................... 356/229, 440, 356/448, 239, 240, 41; 250/559.4, 559.44, 559.45, 574, 576, 214 R, 214 A, 214 LA, 214 RC, 339.11, 341.8, 342.341

[56] References Cited

U.S. PATENT DOCUMENTS 4,960,996 10/1990 Hochstein ............... 250/349
5,676,154 10/1997 Pettersson ............... 128/719
5,708,278 1/1998 Lowne ................ 250/559.4

FOREIGN PATENT DOCUMENTS 0460180 7/1994 European Pat. Off. .
4011510 7/1991 Germany .

Primary Examiner—Frank G. Font
Assistant Examiner—Michael P. Stafira
Attorney, Agent, or Firm—Venable; Norman N. Kunitz

[57] ABSTRACT

The invention relates to a device for detecting a wetting of a pane having a wetting sensor which is provided with a measuring circuit having a transmitter, which emits light, and a receiver, which responds to the emitted light and emits a sensor signal, as well as with an evaluation device for the sensor signal comprising a difference former. A straightforward configuration of the device and a straightforward processing are accomplished in that the measuring circuit has an integration stage for the detection of the amount of light of the light that is incident onto the receiver and a comparator stage with which a trigger signal can be emitted if the amount of light integrated as of a specific point in time exceeds a predetermined threshold, that the total amount of light comprising the light of the transmitter and possible extraneous light and the amount of extraneous light detected when the transmitter is turned off are measured in separate time intervals, that the evaluation device is provided with a timer whose counting value is detected which is generated during the integration time until the arrival of the trigger signal, that a reciprocal value former is provided for the determination of a quantity for the total amount of light and for the amount of extraneous light for forming the reciprocal values of the respective counting values, and that the reciprocal values can be supplied to the difference former with which a signal for the amount of useful light can be derived from the difference between the total amount of light and the amount of extraneous light.

8 Claims, 1 Drawing Sheet

DEVICE FOR DETECTING THE WETTING OF A PANE

STATE OF THE TECHNOLOGY

The invention relates to a device for detecting a wetting of a pane having a wetting sensor which is provided with a measuring circuit having a transmitter, which emits light, and a receiver, which responds to the emitted light and emits a sensor signal, as well as with an evaluation device for the sensor signal comprising a difference former.

EP 0 460 180 B1 proposes a device of this type. By means of scanning of the output signal of a light receiver, the incident total light from the light of a transmitter and from extraneous light of the environment is detected in this known device in a first interval and, in a second interval, which is closely associated with the first interval, only the extraneous light is detected. The evaluating stage in the form of a microcontroller has an analog/digital converter. A differential summation takes place in a differential amplifier so as to form a useful light signal. This device for obtaining the useful signal is relatively complex.

SUMMARY AND ADVANTAGES OF THE INVENTION

It is the object of the invention to provide a device of the type specified at the outset wherein the useful light signal is obtained through simple measures and the wetting of a pane is detected reliably.

The above object generally is achieved according to the present invention by a device for detecting a wetting of a pane having a wetting sensor which is provided with a measuring circuit having a transmitter, which emits light, and a receiver, which responds to the emitted light and emits a sensor signal, as well as with an evaluation device for the sensor signal comprising a difference former, and wherein, it is provided that the measuring circuit has an integration stage for the detection of the amount of light of the light that is incident onto the receiver and a comparator stage with which a trigger signal can be emitted if the amount of light integrated as of a specific point in time exceeds a predetermined threshold, that the total amount of light comprising the light of the transmitter and possible extraneous light and the amount of extraneous light detected when the transmitter is turned off are measured in separate time intervals, that the evaluation device is provided with a timer whose counting value is detected which is generated during the integration time until the arrival of the trigger signal, that a reciprocal value former is provided for the determination of a quantity for the total amount of light and for the amount of extraneous light for forming the reciprocal values of the respective counting values, and that the reciprocal values can be supplied to the difference former with which a signal for the amount of useful light can be derived from the difference between the total amount of light and the amount of extraneous light.

The total amount of light and the amount of extraneous light can be detected reliably in separate intervals by means of the integration stage, for example, of a capacitor, which can be discharged at the beginning of the integration time via an electronic switch, and the counting value, which is obtained until the threshold is reached, with interferences being suppressed through the integration and the common measuring device. The processing complexity for making available the useful light signal is also small since the reciprocal values are formed from the counting values and the useful light signal is obtained from the difference of the quantities thus obtained for the total amount of light and for the amount of extraneous light. A relatively straightforward microcontroller, for example, can be used for the evaluating circuit.

For the further simplification of the processing stages, it is advantageous that the total amount of light is measured recurrently, whereas initially and subsequently the extraneous amount of light is only measured and stored when the amount of extraneous light changes by a predetermined amount, and that the currently stored amount of extraneous light is used to determine the useful light signal. To detect the total amount of light or a corresponding quantity, the latter is measured recurrently so that the information derived from a wetting is detected reliably. Because of the relatively good extraneous light compensation of the current wetting sensors, extraneous light changes occur only occasionally. Therefore, it suffices to detect the amount of extraneous light once in the beginning when the device is activated by turning off the transmitter in an electronically controlled manner for the measuring interval and to then only carry out a measurement of the amount of extraneous light when it is detected that the amount of extraneous light has changed by a predetermined amount. For the determination of the useful light signal, the current stored amount of extraneous light is offset against the measured total amount of light. With these measures, the computing expenditure can be reduced considerably because, for the determination of the amount of extraneous light, a plurality of complex divisions is avoided which, e. g., take 0.6 ms for each division with a conventional microcontroller and are therefore very time-consuming.

In order to detect a change of the amount of extraneous light, it may be provided, e. g., that a comparator is connected between the reciprocal value former and the difference former and that the change of the amount of extraneous light can be determined with the comparator from the total amount of light by detecting a change of the total amount of light with respect to a predetermined value. A change of the amount of extraneous light shows up in the total amount of light so that a change of the amount of extraneous light is definitely detected reliably.

Another option of determining a change of the amount of extraneous light is comprised in that the counting value of the extraneous light measurement is monitored prior to the complex division and that the division for determining the amount of extraneous light is only carried out when a predetermined threshold value is exceeded.

In order to simplify the calculation of the reciprocal values, it is furthermore advantageous to provide that the reciprocal value former carries out a weighting of the reciprocal value with a conversion factor in the magnitude between 10,000 and 100,000.

For example, the conversion factor is 65535, i. e., in hexadecimal position FFFF. This factor is favorable for the conventional 16 bit division. In this manner, a decimal point number for the respective amount of light can be avoided.

An advantageous detection of the wetting, for example, for the automatic actuation of a pane wiper in case of rain or impinging dirt is that the total light measurement is carried out in intervals of a few milliseconds and that the resolution of the timer takes a few milliseconds.

For the simple derivation of the useful light signal, it is furthermore advantageous that the change of the amount of extraneous light can be calculated in the evaluating circuit and that the useful light signal thus formed (actually comprising a useful light portion and an extraneous light portion)

is formed by subtraction of the change of the amount of extraneous light from the total amount of light. In this process, the fact is exploited that the reciprocal values for the current and the previous amount of extraneous light are present in the evaluating circuit.

The invention is described below in greater detail by way of an embodiment with reference to the drawings.

DETAILED DESCRIPTION OF THE PREFERRED EMBODIMENTS

Figure 1:
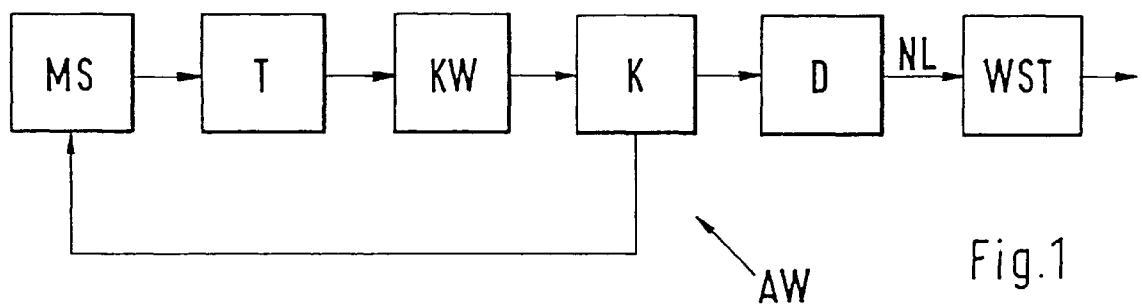
FIG. 1 is a block diagram of a device for detecting a wetting of a pane.

FIG. 1 shows a block diagram for a device for detecting a wetting of a pane having a wetting sensor. The wetting sensor has a measuring circuit MS, to which wetting sensor is connected, an evaluation device or an evaluating circuit with a timer T, a reciprocal value former KW, a comparator K and a difference former D. The difference former D emits a useful light signal NL formed in the evaluating circuit AW in order to actuate a pane wiper, e. g., via a wiper control WST in the event of corresponding wetting events.

Figure 2:
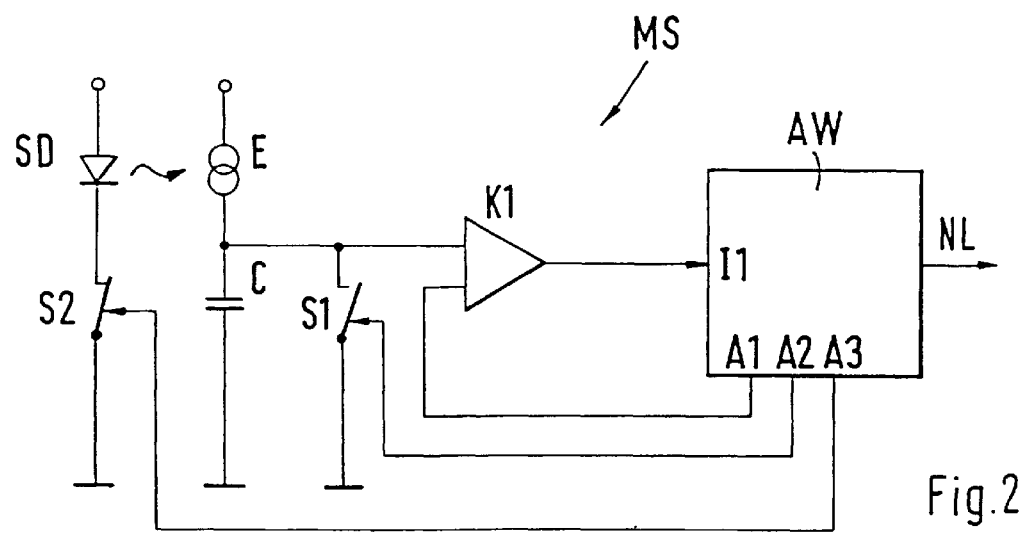
FIG. 2 is an example for a measuring circuit indicated in FIG. 1.

FIG. 2 shows an example for the measuring circuit MS. By means of a transmitter in the form of a transmitting diode SD, light is emitted onto a receiver E via an optical path, into which the pane is coupled. A capacitor C as an integration stage against ground is connected to the one connection of the receiver. A switch S1 is applied to ground parallel to the capacitor C. The one input of a comparator stage K1 is connected between the receiver E and the capacitor C as well as at the switch S1 which is connected there, with the output of the comparator K1 being connected to the input I1 of the evaluating stage AW, for example, a microcontroller. The other input of the comparator stage K1 is connected to an output A1 of the evaluating circuit AW. A further output of the evaluating circuit AW is connected to the switch S1, whereas a third output A3 of the evaluating circuit AW is connected to a further switch S2 via which the transmitting diode SD is applied to ground. The capacitor C can be discharged through controlling the switch S1 from the evaluating circuit AW by means of the measuring circuit MS so that a defined state is present at the beginning of the integration time. The transmitting diode SD can be actuated via the further switch S2 for emitting light or turning it off. One or several suitable thresholds for the comparator stage K1 can be predetermined via the output A1 of the evaluating circuit AW. Further details regarding this circuit are indicated in a parallel patent application to which reference is being made. The integration time is ended as soon as the output signal of the comparator stage K1 exceeds the predetermined threshold. The timer T counts pulses during the integration time, with the resolution of the timer T being, e. g., 2 µs. The counting value of the timer T is supplied to the reciprocal value former KW. The latter forms the reciprocal value of the respective counting values weighted by the factor 65535, i. e., in hexadecimal representation FFFF. The calculation of the reciprocal value takes, e. g., 0.6 ms for each division. Because of the multiplication with the conversion factor 65535, relatively large numerical values are obtained while avoiding decimal point numbers that are difficult to handle. Correspondingly, other numbers can be used as conversion factor, particularly those that can be represented with more digits the hexadecimal system.

The values emitted by the reciprocal value former KW which correspond, on the one hand, to the total amount of light and, on the other hand, to the amount of extraneous light, are forwarded to the difference D forms via the comparator K; the difference former forms the difference between the total amount of light and the amount of extraneous light or the quantities corresponding to these amounts and emits the useful light signal NL.

The comparator K compares the values emitted by the reciprocal value former KW with a predetermined value in order to detect a change of the amount of extraneous light, for example, from a change of the total amount of light.

In the beginning of the activation of the device, a total light measurement is carried out first, with the transmitting diode SD being turned on and emitting light onto the receiver E, while extraneous light from the environment can simultaneously reach the receiver E. The total amount of light is integrated by means of the capacitor C in the manner described until the predetermined threshold is reached and is further processed in the evaluating circuit AW to form the useful light signal, as described above. The transmitting diode SD is then turned off via the further switch S2 so that only extraneous light can reach the receiver E. Once the capacitor C has been discharged via the switch S1, the amount of extraneous light is integrated in a corresponding manner and is processed further in the above-described manner in order to obtain the quantity for the amount of extraneous light. Subsequently, only values for the total amount of light are determined at intervals of, e. g., 6 ms and the useful light signal NL is determined by forming the difference between the total amount of light and the amount of extraneous light or the corresponding quantities in the difference former D. As soon as the total amount of light exceeds the predetermined value of the comparator K in terms of the amount, the transmitting diode SD is turned off in order to carry out an extraneous light measurement.

In this manner, the extraneous light measurement is only carried out when the total amount of light changes, so that complex divisions for calculating the amount of extraneous light can be avoided. Rather, a calculated amount of extraneous light remains stored until a new calculation is carried out on the basis of a change of the total amount of light.

Alternatively, a change of the amount of extraneous light can also be determined in that counting values are evaluated directly during the extraneous light measurement without carrying out a division. If this process results in a change of the counting value for the extraneous light measurement by a defined amount, a change of the amount of extraneous light can be deduced; the latter can then be recalculated by forming the reciprocal value.

Instead of forming the difference between the total amount of light and the amount of extraneous light, a difference can alternatively be formed between the total amount of light and the change of the amount of extraneous light for deducing the useful light signal NL. No additional divisions are necessary for this purpose because the preceding value of the amount of extraneous light and the current value of the amount of extraneous light are present in the evaluating circuit AW.

By means of the useful light signal NL that was obtained, the sensitivity can be adapted in a further processing stage according to the amount of extraneous light or the triggering of a wiping operation can be blocked under certain conditions so as to prevent a faulty wiping operation.

The described measures result in a substantial simplification with respect to design and processing.

I claim:

1. A device for detecting a wetting of a pane having a wetting sensor which is provided with a measuring circuit having a transmitter, which emits light, and a receiver, which responds to the emitted light and emits a sensor signal, as well as an evaluation circuit for the sensor signal including a difference former, and wherein: the measuring circuit (MS) has an integration stage (C) for the detection of the amount of light of the light that is incident onto the receiver (E), and a comparator stage (K1) with which a trigger signal is emitted if the amount of light integrated as of a specific point in time exceeds a predetermined threshold; the evaluation circuit includes means for controlling the turning on and off of the transmitter and the activation of the integration stage to provide measurement, in separate time intervals, of a total amount of light comprising the light of the transmitter (SD) and possible extraneous light, and an amount of extraneous light detected when the transmitter (SD) is turned off; the evaluation circuit (AW) further is provided with a timer (T) whose counting value is detected which is generated during the integration time until the arrival of the trigger signal; a reciprocal value former (KW) is provided for the determination of a quantity for the total amount of light and for the amount of extraneous light by forming reciprocal values of respective counting values of the times; and, the reciprocal values are supplied to the difference former (D) with which a signal for an amount of useful light (NL) is derived from the difference between the total amount of light and the amount of extraneous light.

2. A device according to claim 1, wherein the total amount of light is measured recurrently, whereas initially and subsequently the extraneous amount of is only measured and stored when the amount of extraneous light changes by a predetermined amount, and that the currently stored amount of extraneous light is used to determine the useful light signal (NL).

3. A device according to claim 2, wherein a comparator (K) is connected between the reciprocal value former (KW) and the difference former (D), and the change of the amount of extraneous light is determined with the comparator (K) from the total amount of light by detecting a change of the total amount of light with respect to a predetermined value.

4. A device according to claim 1, wherein for the determination of a change in the amount of extraneous light, the counting value of the measured extraneous light is monitored directly and is compared with a threshold value.

5. A device according to claim 1, wherein the reciprocal value former (KW) carries out a weighting of the reciprocal value with a conversion factor in the magnitude of a few hexadecimal places.

6. A device according to claim 5, wherein the conversion factor is 65535.

7. A device according to claim 1, wherein the evaluation circuit carries out the measurement of the total amount of light in intervals of a few milliseconds and the resolution of the timer (T) takes a few milliseconds.

8. A device according to claim 1, wherein the change of the amount of extraneous light is calculated in the evaluation circuit (AW) and the useful light signal (NL) is formed by subtraction of the change of the amount of extraneous light from the measured total amount of light.

* * * * *